(No Model.)
O. U. GUINAND.
TRICYCLE.
No. 302,398. Patented July 22, 1884.
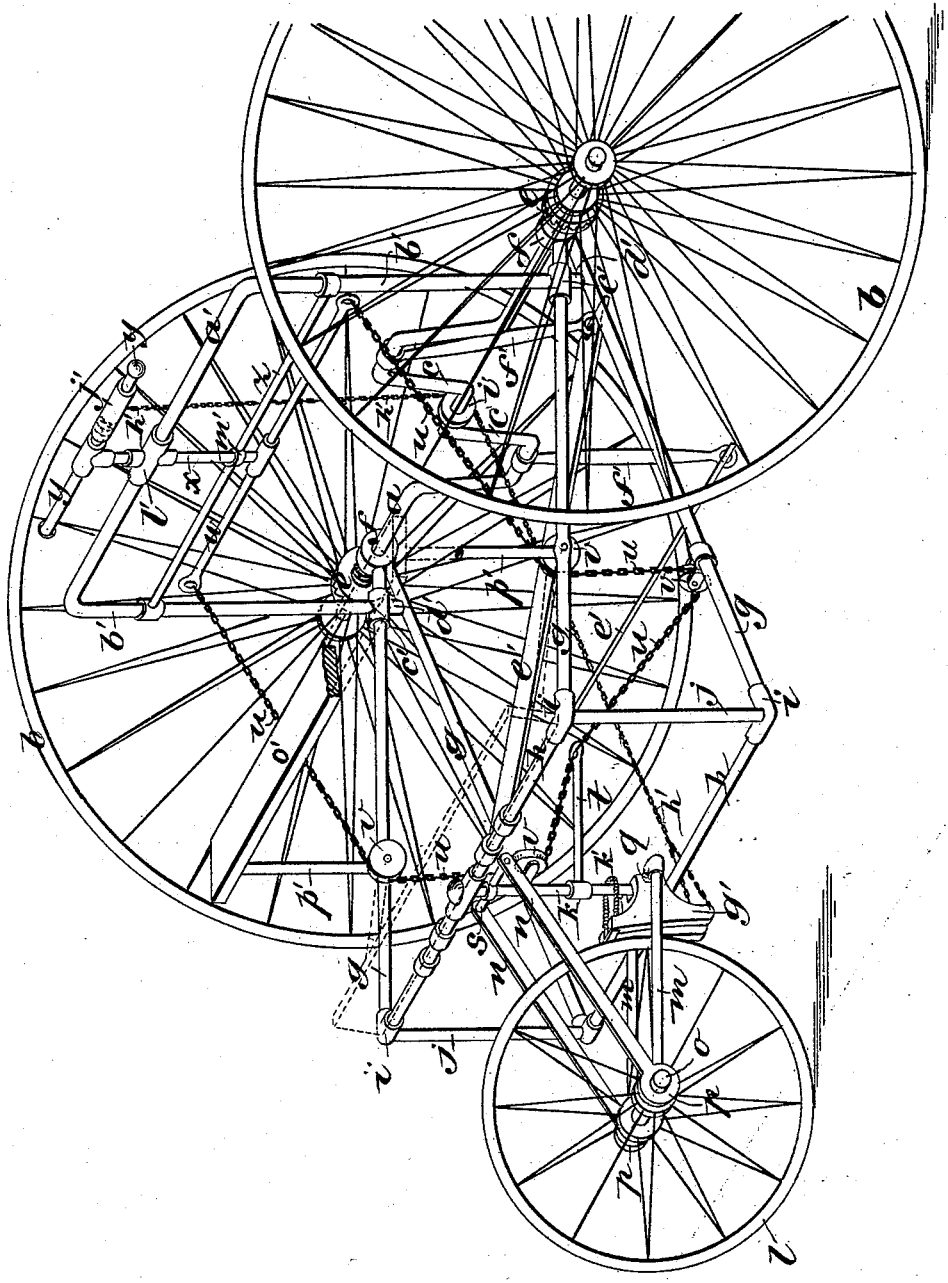
WITNESSES:
INVENTOR:
O. U. Guinand
BY Munn & Co.
ATTORNEYS.

UNITED STATES PATENT OFFICE.

OLIVER U. GUINAND, OF KANSAS CITY, MISSOURI, ASSIGNOR TO HIMSELF, AND D. GAYLORD BLY, OF LOUISVILLE, KENTUCKY.

TRICYCLE.

SPECIFICATION forming part of Letters Patent No. 302,398, dated July 22, 1884.

Application filed November 19, 1883. (No model.)

*To all whom it may concern:*

Be it known that I, OLIVER U. GUINAND, of Kansas City, county of Jackson, Missouri, have invented a new and Improved Tricycle, of which the following is a full, clear, and exact description.

My invention consists of improvements in the construction and arrangements of the frame and driving and steering gear of a tricycle, whereby it is designed to simplify and cheapen the cost of the machine, and at the same time to improve the working qualities, all as hereinafter fully described.

Reference is to be had to the accompanying drawing, forming part of this specification, and in which the figure is a perspective view of my improved tricycle with the seat and one of the seat-standards partly broken away.

I use a double-cranked axle, $a$, for the two large wheels, $b$, the cranks $c$ being placed near about the middle of the axle and the wheels being coupled to the axle by rose-clutches $e$, which will in practice be held in connection for the forward motion by springs that will allow the requisite slip of the clutches for one wheel to overrun the other in turning around curves. Near the clutches the axle has collars $f$ fitted to it, from which the side rails, $g$, of the frame radiate, which rails consist, preferably, of gas-tubes that connect at the rear ends with the cross-bars $h$ by elbows $i$, the cross-bars also being gas-tubes. The upper and lower side rails and cross-bars are connected by the vertical rods $j$. At the center of the cross-bars $h$, between these uprights $j$, there is a vertical rod, $k$, to which the frame of the guide-wheel $l$ is connected for the support of the rear end of the frame and for guiding the machine, said rod $k$ being fitted to turn suitably for guiding the machine by said frame. This frame consists of the lower gas-tube side bars, $m$, and upper side bars, $n$, radiating from the axle $o$ of said wheel $l$, to which they are connected by collars $p$, and they are connected to the guiding-rod $k$ by the T's $q$ and $s$, which are secured to said guiding-rod, so that the frame $m\ n$ may be turned by it, the rod being turned by a lever, $t$, which is connected to the chains $u$, that are stretched in opposite directions over guide-pulleys $v$ to the steering-lever $w$, suspended from the vertical shaft $x$, having the steering-handles $y$ applied to it, and being mounted in suitable T-bearings, $l'$ and $m'$, in the cross-bars $z$ and $a'$, supported above the cranked axle by the uprights $b'$, which are connected to the upper side rails, $g$, by T's $c'$, and the T's are connected to the lower side rails by nipples $d'$, for greater stability of the frame.

The driving-gear consists of the treadles $e'$, pivoted to the upper rear cross-bar, $h$, of the frame level with the crank-axle $a$, and extending forward under and beyond the crank-axle, where they are connected to the cranks by the rods $f'$, so that the dead-centers are practically avoided, as will be seen in the drawing, which shows that the treadle of the upper crank is in labor when the other is on the lower center. For a brake I pivot the block $g'$ on the T $q$, forward of the guiding-wheel $l$, so that the upper end may be pressed backward onto the rim of the wheel by the chain or wire $h'$ passing under a guide-pulley, $i'$, on the axle and up to the drum $j'$ on one of the handles $y$, which drum may be turned to wind up the brake-wire at the same time that the handle is worked for guiding the machine. The upper end of the brake-block $g'$ is connected by the coiled spring $k'$ to the rod $k$, to hold the brake off the wheel.

The steering-shaft $x$ extends down through T's $l'$ and $m'$ in the cross-bars $a'$ and $z$ for its support, and so as to be turned for steering the machine.

I propose in practice to mount a seat, $o'$, on standards $p'$ on the frame $g$ at about one-third of the distance forward of frame $h$, and will pivot the seat-standards to the frame, so that the seat may be turned back out of the way when not required for use, as shown in dotted lines in the drawing.

The frame constructed as I have represented it will be very light, but will be strong and durable, and such a frame, together with the common light bicycle-wheels made with wire spokes, will afford a machine of great strength and capacity for the weight.

Having thus described my invention, I claim as new and desire to secure by Letters Patent—

1. The improved tricycle-frame, consisting of gas-tube side rails, $g$, radiating from collars $f$ on the axle $a$, and connected to cross-bars $h$ by elbows $i$, and the elbows of the upper and lower side rails and cross-bars connected by rods $j$, substantially as described.

2. The guide-wheel $l$, connected to the cross-bars $h$ of the main frame by the upper and lower side bars, $n$ and $m$, T's $q$ $s$, and pivoted rod $k$, said T's being firmly secured to rod $k$, and the side bars, $n$ $m$, connected to the axle $o$, substantially as described.

3. The pivoted rod $k$, having the guiding-wheel frame connected to it, and also having an arm, $t$, connected to the steering-lever $w$ by chains $u$, running over guide-pulleys $v$, substantially as described.

4. The brake $g'$, pivoted to the T $q$, in combination with wheel $l$, spring $k'$, and the brake-chain or wire $h'$, running under guide-pulley $i'$ on the axle, and connected to drum $j'$ on the steering-handle $y$, substantially as described.

OLIVER U. GUINAND.

Witnesses:
WILLIAM C. WATSON,
FREDERICK HOWARD.